United States Patent [19]

Faber

[11] Patent Number: 4,891,838
[45] Date of Patent: Jan. 2, 1990

[54] COMPUTER ACCESSING SYSTEM

[75] Inventor: Lawrence M. Faber, Sunnyvale, Calif.

[73] Assignee: Dental Data Service, Inc., Mountain View, Calif.

[21] Appl. No.: 794,741

[22] Filed: Nov. 4, 1985

[51] Int. Cl.$^4$ .............................................. H04L 9/00
[52] U.S. Cl. ......................................... 380/25; 380/4; 380/50; 340/825.31; 340/825.34
[58] Field of Search ........................ 178/22.08, 22.09; 179/2 EA, 2 EB; 340/825.03, 825.31, 825.34; 235/382; 380/23, 24, 25, 4, 49, 50; 364/200 MS File, 900 MS File

[56] References Cited

U.S. PATENT DOCUMENTS

| | | | |
|---|---|---|---|
| 3,245,045 | 4/1966 | Randlev | 340/172.5 |
| 3,798,605 | 3/1974 | Feistel | 340/172.5 |
| 4,104,721 | 8/1978 | Markstein et al. | 364/200 |
| 4,144,409 | 3/1979 | Utano et al. | 179/2 EB |
| 4,193,061 | 3/1980 | Zoltai | 235/382 |
| 4,198,619 | 4/1980 | Atalla | 340/149 A |
| 4,223,403 | 9/1980 | Konheim et al. | 375/2 |
| 4,264,782 | 4/1981 | Konheim | 178/22 |
| 4,281,215 | 7/1981 | Atalla | 178/22.08 |
| 4,283,599 | 8/1981 | Atalla | 178/22.1 |
| 4,288,659 | 9/1981 | Atalla | 178/22.08 |
| 4,310,720 | 1/1982 | Check, Jr. | 178/22.08 |
| 4,315,101 | 2/1982 | Atalla | 178/22.08 |
| 4,323,921 | 4/1982 | Guillou | 358/114 |
| 4,326,098 | 4/1982 | Bouricius et al. | 178/22.08 |
| 4,328,542 | 5/1982 | Anastas et al. | 364/200 |
| 4,458,315 | 7/1984 | Uchenick | 364/200 |
| 4,482,802 | 11/1984 | Aizawa et al. | 235/379 |
| 4,520,233 | 5/1985 | Smith | 178/22.08 |
| 4,531,023 | 7/1985 | Levine | 178/22.08 |

*Primary Examiner*—Stephen C. Buczinski
*Assistant Examiner*—Bernarr Earl Gregory
*Attorney, Agent, or Firm*—Jack M. Wiseman

[57] ABSTRACT

An operator from a computer terminal initially enters a password or passwords into a computer system over a specific terminal line. If the password or passwords transmitted over the specific terminal is recognized by a master command line interpreter, then the master command line interpreter compares the password or passwords and the specific terminal with a table stored in the computer system. If the comparison by the master command line interpreter is invalid, then the master command line interpreter instructs the computer system not to log in the operator's request for access to the computer system. If the comparison by the master command line interpreter is valid, then the master command line interpreter instructs the computer system to log in the operator's request for access to the computer system. The master command line interpreter also instructs the computer system to assign a selected user command line interpreter. The accessible data or tasks to which access is gained by the operator is the data or tasks associated with the assigned user command line interpreter.

3 Claims, 3 Drawing Sheets

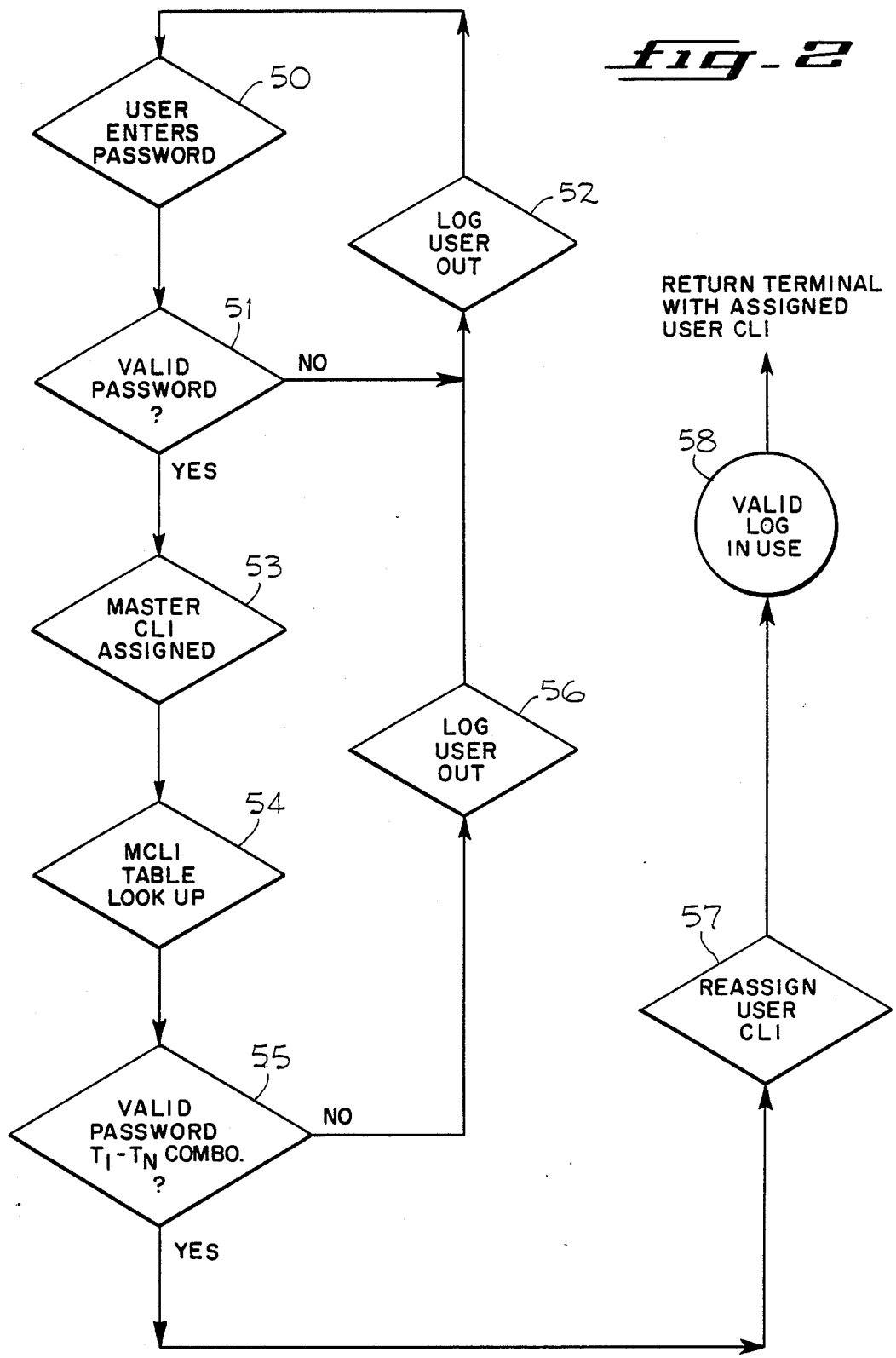

fig-4

TABLE FOR MASTER CLI
DURING 08:00 TO 17:00 HOURS

|            | TT0  | TT1  | TT2  | ····· | TTN  |
|------------|------|------|------|-------|------|
| PASSWORD 1 | CLIA | CLIB | CLIB |       | CLIN |
| PASSWORD 2 | CLIB | CLIB | CLIB |       | CLIN |
| PASSWORD 3 | NONE | CLIB | CLIB |       | NONE |
| ⋮          |      |      |      |       |      |
| PASSWORD N | NONE | CLI* | CLI* |       |      | fig-5

TABLE FOR MASTER CLI
DURING 17:00 TO 07:59 HOURS

|            | TT0  | TT1  | TT2 ······ | TTN  |
|------------|------|------|------------|------|
| PASSWORD 1 | CLIA | NONE | NONE ······ | NONE |
| PASSWORD 2 | NONE | · · · · · · · · · · · | | NONE |
| ⋮          |      |      |            |      |
| PASSWORD N | NONE | · · · · · · · · · · · · · | | NONE |

COMPUTER ACCESSING SYSTEM

BACKGROUND OF THE INVENTION

The present invention relates in general to a system for securing communication links between a computer system and a terminal, and more particularly to a system for accessing a computer system through terminal lines over which passwords are transmitted.

Computer systems have been subject to a variety of computer risks. Passwords have been used to authenticate a terminal user. The use of passwords have been augmented by secondary security measures. Such systems have not met the security standards presently required by governmental institutions and similar organizations.

In the patent to Atalla, U.S. Pat. No. 4,288,659, an operator actuated a keyboard to produce personal identification number, machine identification number and sequence number. The data was processed by an encoding module and an initialization key code produced by the encoding module was stored in a storage register. The transmission authentication code was transmitted to a central processing unit. The central processing unit included a memory file. An encoding module associated with the central processing unit produced from the stored memory file a personal identification number, a machine identification number and a sequence number. A transmission authentication code was produced therefrom which was compared to the initially produced transmission authentication code. If the comparison were favorable, then the operator had access to the stored data.

In the patent to Check, Jr., U.S. Pat. No. 4,310,720, a communication link was established between a remote user and a computer through an access unit. The access unit generated a password and a number gas an access code. The access code was transmitted and compared with an access code generated by a computer access controller. Additionally, the access code and the number provided an encoding key which was compared with an encoding key generated by the computer access controller. A favorable comparison established the communication link between the remote user and the computer.

SUMMARY OF THE INVENTION

A system for inhibiting an unauthorized terminal from gaining access to data stored in a computer system in which a password (or passwords) is entered in the computer system over a terminal line. A master command line interpreter compares the password (or passwords) and the terminal line over which the password (or passwords) is transmitted with a table stored in the computer system to instruct the computer system as to whether the terminal shall have access to data stored in the computer system.

An object of the present invention is to provide a security system for a computer system employing passwords transmitted from a terminal in which access to data or tasks stored in the computer system is more effectively controlled and in which unauthorized use of confidential password (or passwords) to data or tasks is more effectively prohibited.

Another object of the present invention is to provide a security system for a computer system employing passwords transmitted from a terminal in which an interaction between computer hardware and computer software enables changes in the security system for gaining access to data or tasks stored in the computer system to be implemented with facility, rapidly and frequently.

Another object of the present invention is to provide a security system for a computer system employing passwords transmitted from a terminal in which an interaction between computer hardware and computer software enables the security system for gaining access to data or tasks stored in the computer system to be installed in various computer systems with facility and while the computer system is in operation.

A feature of the present invention is that access to a computer system by a terminal requires a command line interpreter to compare a password (or passwords) and the terminal line over which the password (or passwords) is transmitted with a table stored in the computer for instructing the computer system as to whether the terminal shall have access to data or tasks stored in the computer system.

Another feature of the present invention is that access to a computer system by a terminal requires a master command line interpreter to compare a password and the terminal line over which the password is transmitted with a table stored in the computer for instructing the computer system as to whether the terminal shall access to data or tasks stored in the computer system and if the terminal shall have access to data or tasks stored in the computer system for instructing the computer system to assign a user command line interpreter for limiting the access to data or tasks under the control of the assigned user command line interpreter.

BRIEF DESCRIPTION OF THE DRAWINGS

FIG. 2 is a flow chart for the program stored in a master command line interpreter of the computer system.

FIG. 4 is a table stored in a memory device of the computer system for comparison with a password and a terminal line over which the password is transmitted.

FIG. 5 is a table stored in a memory device of the computer system for comparison with a password and a terminal line over which the password is transmitted during a time period different from the time period assigned to the table shown in FIG. 4.

DESCRIPTION OF THE PREFERRED EMBODIMENT

Figure 1:
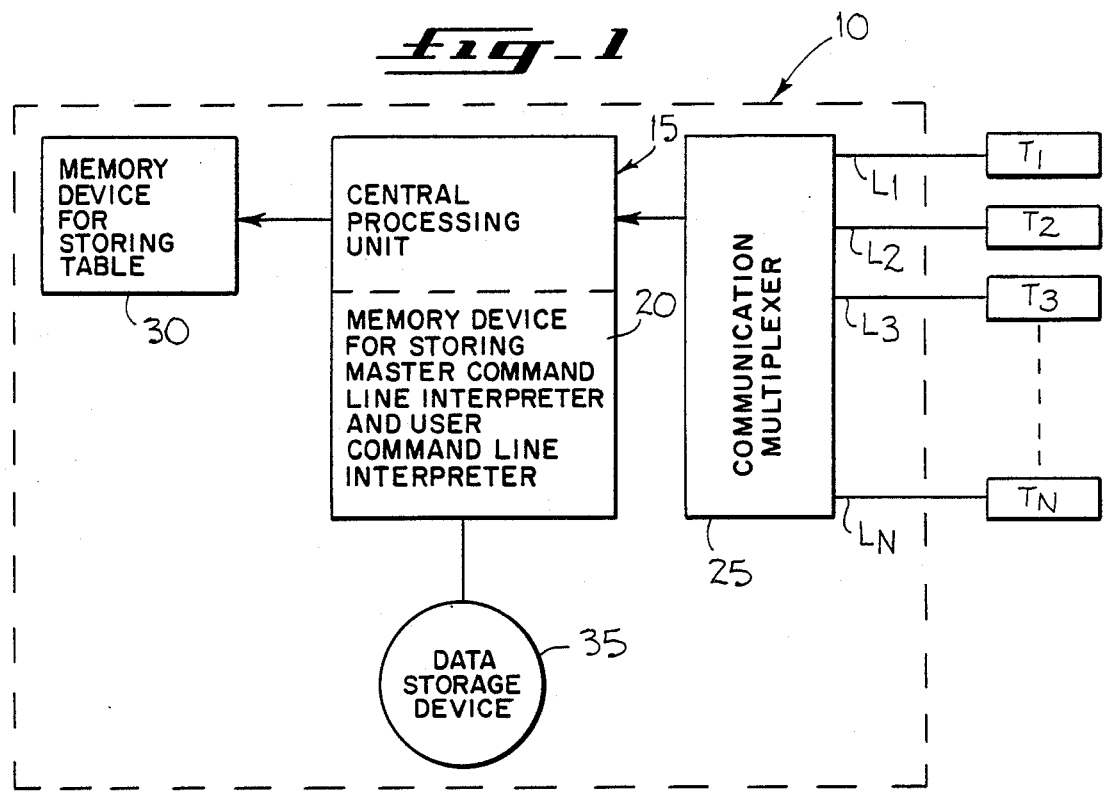
FIG. 1 is a block diagram of a computer system and a security system thereof for inhibiting the unauthorized access to data or tasks stored in the computer system illustrated with terminals and interconnecting terminal lines.

Illustrated in FIG. 1 is a conventional and well-known computer system 10. A typical computer system that may be employed is the type sold by Digital Equipment Company as the PDP 11-44 with RSX11M+ operating system. The computer system 10 is of the type employing a command line interpreter (CLI). Included in the computer system 10 is a conventional and well-known central processing unit 15. By way of example, the central processing unit 15 may be one sold by Digital Equipment Company in the PDP series.

The computer system 10 includes a memory device 20 in which is stored the program identified herein as the master CLI. I the exemplary embodiment, the memory device 20 is included in the central processing unit 15. A flow chart of the program stored in the master CLI memory device 20 is shown in FIG. 2.

Communicating with the central processing unit 15 is a conventional and well-known communication multiplexer 25 of the computer system 10 for establishing communication links between the central processing unit 15 and conventional and well-known computer terminals $T_1$-$T_N$ or other similar operational devices over conventional and well-known terminal lines $L_1$-$L_N$, respectively. The multiplexer 25, in the preferred embodiment, is of the type sold by Emulex of Costa Mesa, Calif., Model No. CS21/H2. Passwords are transmitted from the computer terminals $T_1$-$T_N$, respectively, over terminal lines $L_1$-$L_N$, respectively, to the central processing unit 15 via the multiplexer 25, through the use of digital signals decoded at the central processing unit 15 in a well-known manner. The multiplexer 25 serves to identify for the central processing unit 15 the specific terminal line of the terminal lines $L_1$-$L_N$ over which a password (or passwords) is transmitted. The password (or passwords) transmitted from the terminals $T_1$-$T_N$ over the terminal lines $L_1$-$L_N$ could be by keyboard or by telephone dialing encoder device, not shown.

A memory device 30 of the computer system 10 stores a table (FIGS. 4 and 5) which is compared with the password (or passwords) and the terminal line over which the password (or passwords) is transmitted to the central processing unit 15. The master CLI compares the data in the table with the password (or passwords) and the terminal line over which the password (or passwords) is transmitted for accepting or rejecting access to data and tasks stored in the computer system 10. Stated otherwise, the master CLI accepts the log in or logs out the operator transmitting the password (or passwords) over the terminal line $L_1$-$L_N$ based on a comparison of the password (or passwords) and the terminal line $L_1$-$L_N$ with the table stored in the memory device 30. The memory device 30 may be included in the central processing unit 15 or may be installed outside of the central processing unit 15.

Figure 3:
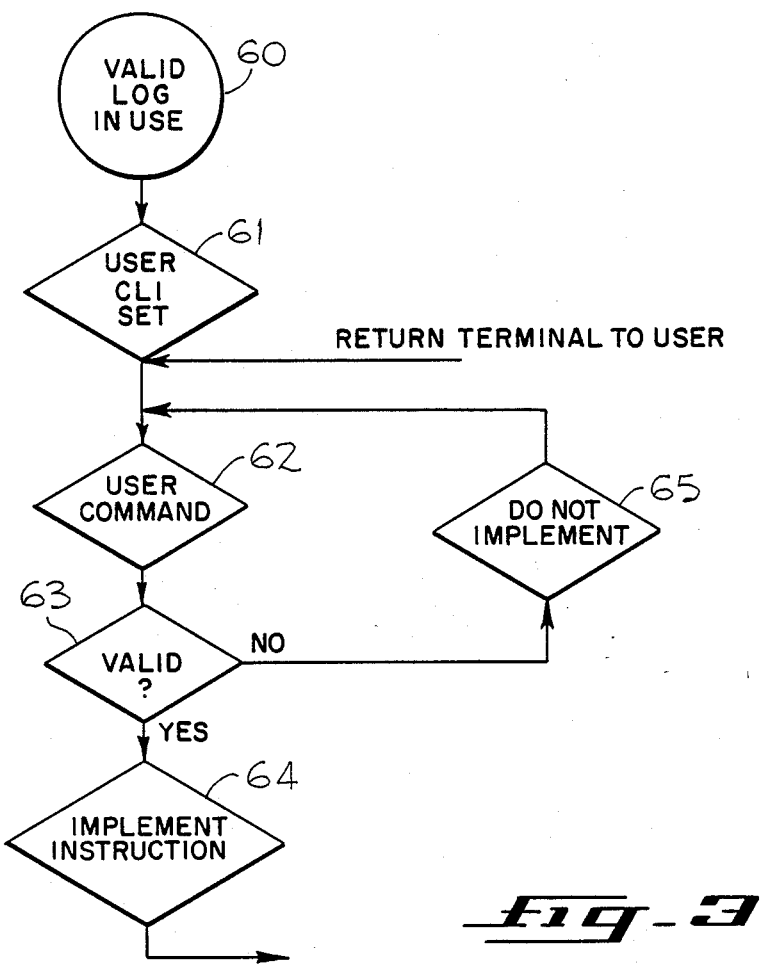
FIG. 3 is a flow chart for the program stored in the user command line interpreter of the computer system.

The central processing unit 15 communicates with one or more input/output data storage devices 35 of the computer system 10. The input/output data storage devices 35 store data and tasks to which access is sought by the terminals $T_1$-$T_N$. In the exemplary embodiment, at least one of the terminals $T_1$-$T_N$ seeks access to the data or tasks stored in the input/output data storage device 35 of the computer system 10. In the exemplary embodiment, a user CLI is stored in the memory device 20. A flow chart for the user CLI program is shown in FIG. 3. Over the terminal lines $L_1$-$L_N$, respectively, are transmitted passwords from the terminals $T_1$-$T_N$ seeking access to data or tasks stored in the computer system. The characters of the passwords are initiated by any suitable means such as a telephone or a keyboard or any suitable device located at the terminal seeking access to the data or tasks stored in the computer system 10. The passwords used by the central processing unit 15 are in digital form. The multiplexer 25 identifies for the central processing unit 15 the specific terminal line over which the password (or passwords) was transmitted.

An operator seeking access to data or tasks stored in the computer system 10 logs in a password (or passwords) over a specific terminal line of the terminal lines $L_1$-$L_N$ from the computer terminal of the terminals $T_1$-$T_N$ associated with the specific terminal line. The multiplexer 25 advances the password (or passwords) to the central processing unit 15 and identifies the specific terminal over which the password (or passwords) is transmitted.

The master CLI stored in the memory device 20 interprets at steps 50 and 51 (FIG. 2) whether the password (or passwords) is one to be accepted or rejected by the central processing unit 15. If the password (or passwords) is to be rejected, the central processing unit 15 at step 52 will not log in the user or permit access over the specific terminal line. If the password (or passwords) is accepted, the master CLI is assigned to the user by the central processing unit 15 at step 53 over the specific terminal line.

At steps 54 and 55, the master CLI compares the password (or passwords) and the specific terminal line over which the password (or passwords) is transmitted with the table (FIG. 4 or FIG. 5) stored in the memory device 30 to determine whether the terminal associated with the specific terminal line should or should not gain access to the data or tasks stored in the computer system 10. If the master CLI interprets the password (or passwords) and terminal line over which the password (or passwords) is transmitted to be invalid, then the master CLI instructs the central processing unit 15 at step 56 to refuse access to the data or tasks stored in the computer system 10 over the specific line which the password (or passwords) was transmitted by logging terminal out. If the master CLI interprets the password (or passwords) and the terminal line over which the password (or passwords) is transmitted to be valid, then the master CLI at steps 57 and 58 instructs the central processing unit 15 to sequence or assign a user CLI associated with the valid password (or passwords) and terminal line. The user CLI is a program stored in a memory device.

The assigned or sequenced user CLI is stored in the memory device 20. Assigned user CLI at steps 60 and 61 limits accessibility for the logged-in terminal to data and tasks stored in the storage device 35 to the data and tasks assigned to the sequenced user CLI for accessiblity. The accessible data or tasks to which access is gained by the operator at the terminal line logged-in is the data or tasks assigned to the assigned user command line interpreter. The user CLI filters out all data and tasks request from the logged-in terminal upon receipt of invalid instructions from the logged-in terminal. The user CLI recognizes data and tasks request and advances data and tasks under proper instructions from the logged-in terminal and filters out improper instructions from the logged-in terminal.

I claim:

1. A system for accessing a computer system comprising:
   (a) a computer system storing data, a first memory device for said computer system storing a master command line interpreter, a second memory device for said computer system storing a table of passwords and terminal lines;
   (b) a plurality of computer terminals, each of said computer terminals having an assigned password transmittable therefrom; and
   (c) a plurality of terminal lines establishing respective communication links between said computer system and said computer terminals, said computer terminals being arranged to transmit over said terminal lines, respectively, assigned passwords, (d) said master command line interpreter comparing a password with the terminal line over which the password is transmitted and the table of passwords with terminal lines stored in said second memory device for instructing said computer system to enable or refuse access to data stored in said computer system by the computer terminal assigned the compared password over the terminal line which the compared password was transmitted, (e) said computer system further comprising a data storage device and a user command line interpreter, said master command line interpreter instructing said computer system to sequence said user command line interpreter upon instructing said computer system to access the computer terminal assigned the compared password over the terminal line which the compared password was transmitted, said user command line interpreter in response to being sequenced by said computer system limits the computer terminal having access thereto over the terminal line transmitting the compared password to data stored in said data storage device designated for said sequenced user command line interpreter.

2. A system for accessing a computer system according to claim 1 wherein said computer system comprises a multiplexer connected to said terminal lines for designating the terminal line over which the compared password is transmitted.

3. A method of accessing a computer system by a computer terminal having an assigned password through a terminal line establishing a communication line between the computer terminal and the computer system comprising the steps of:

(a) transmitting from a computer terminal an assigned password over an associated terminal line to a computer system;

(b) comparing through a master command line interpreter the assigned password and the associated terminal line with a table stored in the computer system to instruct the computer system to access or refuse to access the computer terminal to data stored in a data storage device of the computer system;

(c) instructing the computer system to sequence a user command line interpreter upon instruction from said master command line interpreter to access the computer terminal to data stored in the data storage device of the computer system; and (d) limiting through the sequenced user command line interpreter the data stored in said data storage device to which the computer terminal shall have access.

* * * * *